US012659832B2

(12) United States Patent
Yi et al.

(10) Patent No.: US 12,659,832 B2
(45) Date of Patent: Jun. 16, 2026

(54) SIGNAL TRANSMISSION AND RECEPTION METHOD AND APPARATUS AND COMMUNICATION SYSTEM

(71) Applicant: 1FINITY Inc., Kawasaki (JP)

(72) Inventors: Su Yi, Beijing (CN); Guorong Li, Beijing (CN); Meiyi Jia, Beijing (CN); Lei Zhang, Beijing (CN)

(73) Assignee: 1FINITY Inc., Kawasaki (JP)

( * ) Notice: Subject to any disclaimer, the term of this patent is extended or adjusted under 35 U.S.C. 154(b) by 319 days.

(21) Appl. No.: 18/218,686

(22) Filed: Jul. 6, 2023

(65) Prior Publication Data

US 2023/0345345 A1      Oct. 26, 2023

Related U.S. Application Data

(63) Continuation of application No. PCT/CN2021/071613, filed on Jan. 13, 2021.

(51) Int. Cl.
*H04W 40/22* (2009.01)
*H04W 28/12* (2009.01)
(52) U.S. Cl.
CPC ........... *H04W 40/22* (2013.01); *H04W 28/12* (2013.01)
(58) Field of Classification Search
None
See application file for complete search history.

(56) References Cited

U.S. PATENT DOCUMENTS

2011/0273983 A1   11/2011   Bergamasco et al.
2021/0127293 A1   4/2021   Hong

2021/0168656 A1   6/2021   Li et al.
2021/0377787 A1   12/2021   Zhuo et al.
2022/0369190 A1 *  11/2022   Diao ...................... H04W 76/20
2023/0171745 A1 *  6/2023   Ghanbarinejad ..... H04W 76/19
370/329

(Continued)

FOREIGN PATENT DOCUMENTS

CN         110636548  A      12/2019
CN         110856222  A      2/2020

(Continued)

OTHER PUBLICATIONS

International Search Report and Written Opinion of the International Searching Authority issued by the China National Intellectual Property Administration for corresponding International Patent Application No. PCT/CN2021/071613, mailed on Sep. 28, 2021, with an English translation.

(Continued)

*Primary Examiner* — Jay P Patel
(74) *Attorney, Agent, or Firm* — Myers Wolin, LLC

(57) ABSTRACT

A signal transmission and reception method and apparatus and a communication system, the signal transmission and reception apparatus being applicable in an IAB-DU and includes a first receiver configured to receive uplink data transmitted to a parent node of an integrated access and backhaul (IAB) node via an uplink; and a first transmitter configured to transmit flow control feedback information to a child node of the integrated access and backhaul node, the flow control feedback information being used to indicate a load status of uplink transmission of the integrated access and backhaul node.

20 Claims, 6 Drawing Sheets

(56) References Cited

U.S. PATENT DOCUMENTS

| | | | | |
|---|---|---|---|---|
| 2023/0180090 A1* | 6/2023 | Zhu | ...................... | H04W 76/19 |
| | | | | 370/331 |
| 2023/0239940 A1* | 7/2023 | Luo | ................... | H04B 7/15528 |
| | | | | 370/329 |
| 2023/0247521 A1* | 8/2023 | Zhu | ................... | H04W 36/0055 |
| 2023/0262827 A1* | 8/2023 | Liu | ...................... | H04W 76/20 |
| | | | | 370/329 |
| 2023/0284083 A1* | 9/2023 | Tesanovic | .............. | H04L 47/30 |
| | | | | 370/235 |

FOREIGN PATENT DOCUMENTS

| | | | |
|---|---|---|---|
| CN | 111586749 A | 8/2020 | |
| CN | 111918331 A | 11/2020 | |
| CN | 112075097 A | 12/2020 | |
| KR | 10-2020-0013576 A | 2/2020 | |

OTHER PUBLICATIONS

3GPP TS 38.321 V16.1.0, "3rd Generation Partnership Project; Technical Specification Group Radio Access Network; NR; Medium Access Control (MAC) protocol specification (Release 16)", Jul. 2020.

3GPP TS 38.340 V16.1.0, "3rd Generation Partnership Project; Technical Specification Group Radio Access Network; NR; Backhaul Adaptation Protocol (BAP) specification (Release 16)", Jul. 2020.

3GPP TS 38.473 V16.1.0, "3rd Generation Partnership Project; Technical Specification Group Radio Access Network; NG-RAN;F1 application protocol (F1AP) (Release 16)", Mar. 2020.

First Notification of Office Action and Search Report issued by the China National Intellectual Property Administration for corresponding Chinese Patent Application No. 202180088995.X, mailed on Apr. 23, 2026, with an English translation.

* cited by examiner

10

303

IAB-node receives configuration
information transmitted by a donor
central unit of the IAB-node

301

IAB-node transmits data to a parent
node thereof via an uplink

302 the IAB-node transmits flow control
feedback information to a child node,
the flow control feedback information
being used to indicate a load status of
uplink transmission of the IAB-node

SIGNAL TRANSMISSION AND RECEPTION METHOD AND APPARATUS AND COMMUNICATION SYSTEM

CROSS-REFERENCE TO RELATED APPLICATION

This application is a continuation application of International Application PCT/CN2021/071613 filed on Jan. 13, 2021, and designated the U.S., the entire contents of which are incorporated herein by reference.

TECHNICAL FIELD

This disclosure relates to the field of communication technologies.

BACKGROUND

Integrated access and backhaul (IAB) enables a function of wireless relay in a next generation radio access network (NG-RAN). An integrated access and backhaul node (IAB-node) supports access and backhaul via New Radio (NR). A termination point of NR backhaul at a network side is referred to as an IAB-donor, which denotes a network device (e.g. a gNB) supporting an IAB function.

An IAB-node is connected to an IAB-donor via one or more hops. These multi-hop connections form a directed acyclic graph (DAG) topological structure with an IAB-donor as a root node. The IAB-donor is responsible for executing centralized resource management, topology management and routing management in an IAB network topology.

The IAB-node supports a function of a gNB-DU (distributed unit), and an IAB-node DU is also referred to as an IAB-DU, which is an end point of a New Radio access (NR access) interface to a terminal equipment (UE) and a next hop IAB-node and is also an end point of an F1 protocol to a gNB-CU (central unit) on the IAB-node. The IAB-DU may serve for a common UE and an IAB child node.

In addition to the function of the gNB-DU, the IAB-node also supports some functions of the UE, referred to as an IAB-MT (mobile termination). The IAB-MT includes, for example, a physical layer, layer 2, RRC and NAS functions to be connected to a gNB-DU on another IAB-node or IAB-donor, a gNB-CU on the IAB-donor and a core network. The IAB-MT may support such functions as a UE physical layer, an access stratum (AS), a radio resource control (RRC) layer and a non-access stratum (NAS), and may be connected to an IAB parent node.

FIG. 1 is a schematic diagram of the IAB topological structure. As shown in FIG. 1, in an IAB topological structure 10, an IAB-node 100 includes an IAB-MT functional unit 101 and an IAB-DU functional unit 102, neighboring nodes connected to an interface of the IAB-DU functional unit 102 are referred to as child nodes, such as child nodes 201, 202 and 203 shown in FIG. 1, the IAB-DU functional unit 102 may be in communication with the child nodes 201, 202 and 203 via an air interface (Uu), neighboring nodes connected to an interface of the IAB-MT functional unit 101 are referred to as parent nodes, such as parent nodes 301 and 302 shown in FIG. 1, and the IAB-MT functional unit 101 may be in communication with the parent nodes 301 and 302 via an air interface (Uu).

As shown in FIG. 1, a direction from the IAB-node 100 to the child nodes 201, 202 and 203 is referred to as a downstream direction, and a direction from the IAB-node 100 to the parent nodes 301 and 302 is referred to as an upstream direction. And an IAB-donor (not shown) executes centralized resource management, topology management and routing management for the IAB topological structure 10.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY OF THE DISCLOSURE

It is possible that congestion occurs when a data rate at an ingress of the IAB-node does not match with a data rate at an egress thereof.

It was found by the inventors that there exist certain limitations in existing methods for alleviating congestion. For example, in alleviating congestion in uplink transmission in a scheduling method, it is hard to obtain high-precision control, and furthermore, transmission efficiencies of data are relatively low sometimes.

In order to solve at least one of the above problems, embodiments of this disclosure provide a signal transmission and reception method and apparatus and a communication system, in which an integrated access and backhaul node (IAB-node) transmits flow control feedback information to a child node to indicate a load status of IAB uplink transmission. Hence, flows may be controlled at a side of the child node, thereby improving precision of the control and transmission efficiencies of data while alleviating uplink transmission congestion.

According to an aspect of the embodiments of this disclosure, there is provided a signal transmission and reception apparatus, applicable in an integrated access and backhaul (IAB) node, including:

a first receiving unit configured to receive uplink data transmitted to a parent node of an integrated access and backhaul (IAB) node via an uplink; and a first transmitting unit configured to transmit flow control feedback information to a child node of the integrated access and backhaul node, the flow control feedback information being used to indicate a load status of uplink transmission of the integrated access and backhaul node.

According to another aspect of the embodiments of this disclosure, there is provided a signal transmission and reception apparatus, applicable in an integrated access and backhaul (IAB) node, including:

a second transmitting unit configured to transmit data to a parent node; and a third receiving unit configured to receive flow control feedback information transmitted by the parent node, the flow control feedback information being used to indicate a load status of uplink transmission of the parent node.

According to a further aspect of the embodiments of this disclosure, there is provided a signal transmission and reception apparatus, applicable in an integrated access and backhaul (IAB) node, including:

a third receiving unit configured to receive flow control feedback information transmitted by a parent node, the flow control feedback information being used to indicate a load status of uplink transmission of the parent node; and a first processing unit, set in a backhaul adaption protocol (BAP) entity of the integrated access and backhaul (IAB) node, configured to pass down data to a lower layer according to the flow control feedback information.

According to still another aspect of the embodiments of this disclosure, there is provided a signal transmission and reception apparatus, applicable in an integrated access and backhaul (IAB) node, including:

a third receiving unit configured to receive flow control feedback information transmitted by a parent node, the flow control feedback information being used to indicate a load status of uplink transmission of the parent node; and a second processing unit, set in an MAC layer entity of an IAB-node, configured to perform reporting of a buffer status report (BSR) and/or resource allocation of a logical channel according to the flow control feedback information.

According to yet another aspect of the embodiments of this disclosure, there is provided a signal transmission and reception method, including:

transmitting, by an integrated access and backhaul (IAB) node, data to a parent node via an uplink; and transmitting, by the integrated access and backhaul node, flow control feedback information to a child node of the integrated access and backhaul node, the flow control feedback information being used to indicate a load status of uplink transmission of the integrated access and backhaul node.

According to yet still another aspect of the embodiments of this disclosure, there is provided a signal transmission and reception method, including:

transmitting, by an integrated access and backhaul (IAB) node, data to a parent node; and receiving flow control feedback information transmitted by the parent node, the flow control feedback information being used to indicate a load status of uplink transmission of the parent node.

According to further still another aspect of the embodiments of this disclosure, there is provided a signal transmission and reception method, including:

receiving, by an integrated access and backhaul (IAB) node, flow control feedback information transmitted by a parent node, the flow control feedback information being used to indicate a load status of uplink transmission of the parent node; and passing down, by a backhaul adaption protocol (BAP) entity of the integrated access and backhaul (IAB) node, data to a lower layer according to the flow control feedback information.

According to yet further still another aspect of the embodiments of this disclosure, there is provided a signal transmission and reception method, including:

receiving, by an integrated access and backhaul (IAB) node, flow control feedback information transmitted by a parent node, the flow control feedback information being used to indicate a load status of uplink transmission of the parent node; and Performing, by a media access control (MAC) entity of the integrated access and backhaul (IAB) node, reporting of a buffer status report (BSR) and/or resource allocation of a logical channel.

An advantage of the embodiments of this disclosure exists in that the IAB-node transmits the flow control feedback information to the child node to indicate the load status of IAB uplink transmission. Hence, flows may be controlled at a side of the child node, thereby improving precision of the control and transmission efficiencies of data while alleviating uplink transmission congestion.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments.

Moreover, in the drawings, like reference numerals designate corresponding parts throughout the several views and may be used to designate like or similar parts in more than one embodiment.

DETAILED DESCRIPTION OF THE DISCLOSURE

Figure 1:
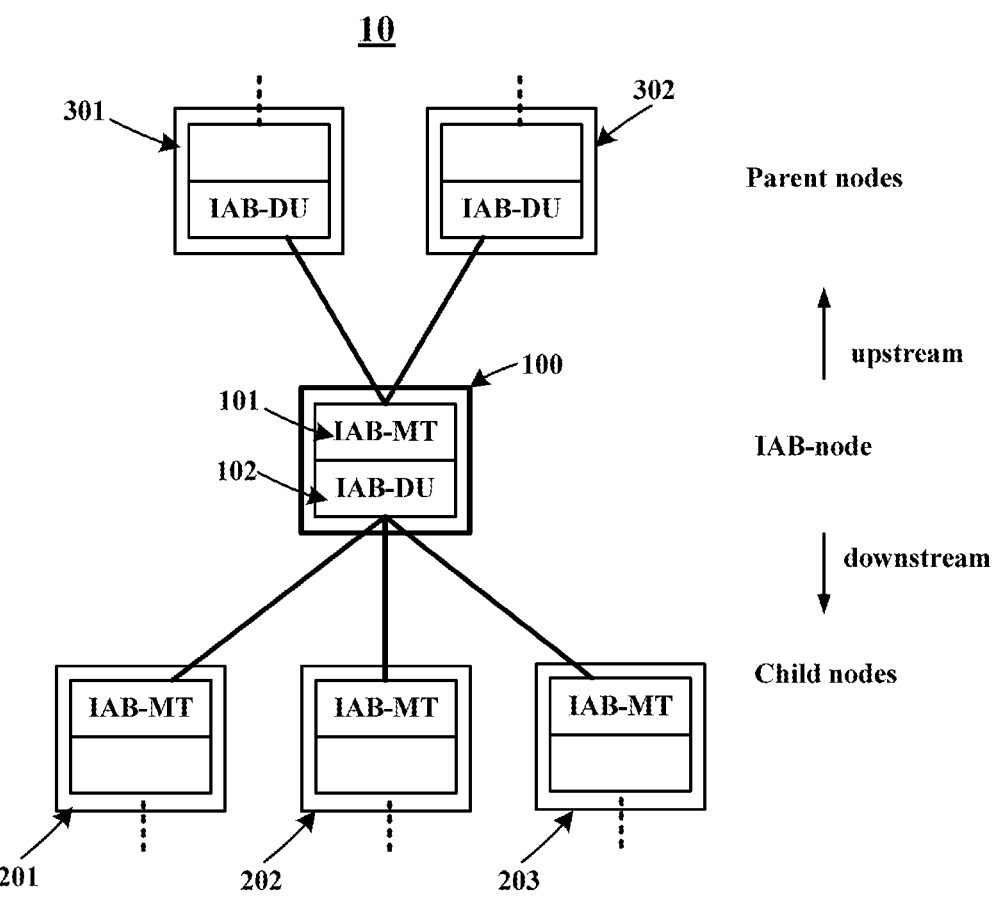
FIG. 1 is a schematic diagram of an IAB topological structure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and New Radio (NR) in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following devices: a node and/or donor in an IAB architecture, a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico). The term "base station" may include some or all of its functions, and each base station may provide communication coverage for a specific geographical area. And a term "cell" may refer to a base station and/or its coverage area, depending on a context of the term.

In the embodiments of this disclosure, the term "user equipment (UE)" or "a terminal equipment (TE) or terminal equipment" refers to, for example, an equipment accessing to a communication network and receiving network services via a network device. The terminal equipment may be fixed or mobile, and may also be referred to as a mobile station (MS), a terminal, a subscriber station (SS), an access terminal (AT), and a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Moreover, the term "network side" or "network device side" refers to a side of a network, which may be a base station or one or more network devices including those described above. The term "user side" or "terminal side" or "terminal equipment side" refers to a side of a user or a terminal, which may be a UE, and may include one or more terminal equipment(s) described above.

Embodiment of a First Aspect

In an IAB network, for downlink congestion, the congestion may be alleviated in a hop-by-hop downlink flow control method. This method is carried out by a backhaul adaptive protocol (BAP) control protocol data unit (PDU) of a BAP sublayer.

For uplink congestion, it may be solved by an IAB-node through implementation. For example, when uplink transmission of the IAB-node slows down (i.e., uplink congestion occurs), uplink scheduling for child nodes may be restricted.

Figure 2:
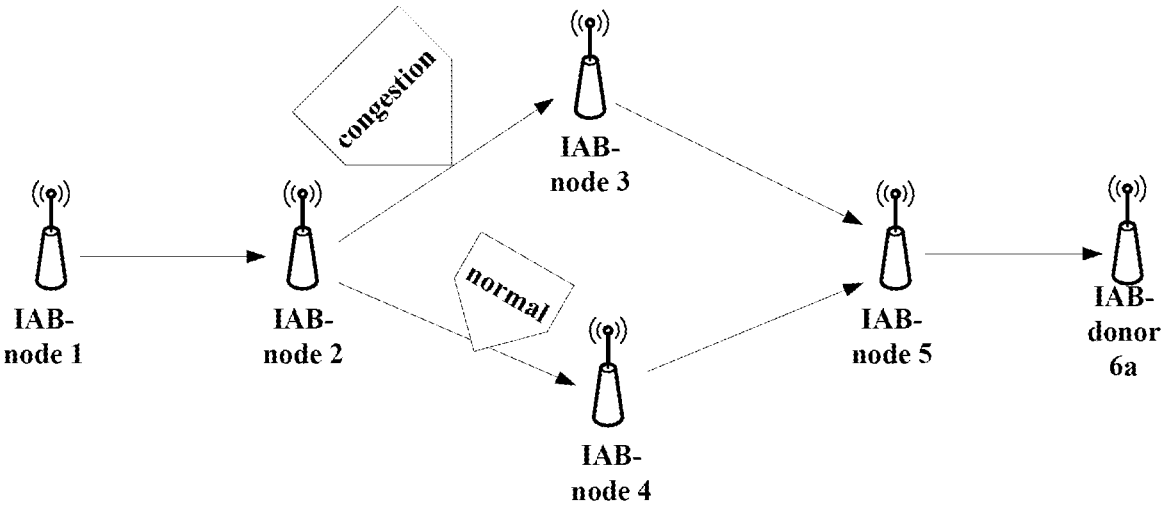
FIG. 2 is a schematic diagram of uplink congestion.

FIG. 2 is a schematic diagram of the uplink congestion. As shown in FIG. 2, an uplink between an IAB-node 2 and an IAB-node 3 is subjected to congestion, for example, an uplink buffer load exceeds a certain threshold. Transmission in the uplink direction between the IAB-node 2 and an IAB-node 4 is normal and is not subjected to congestion. The IAB-node 3 may restrict uplink scheduling of IAB-node 2 (i.e., a child node), thereby achieving uplink flow control to alleviate uplink congestion.

In addition, in FIG. 2, the IAB-node 3 and the IAB-node 4 are both child nodes of an IAB-node 5, the IAB-node 5 is a child node of a donor IAB-node 6a, the IAB-node 2 is a child node of the IAB-node 3 and the IAB-node 4, and an IAB-node 1 is a child node of the IAB-node 2.

Some limitations exist in the above method for alleviating uplink congestion by restricting uplink scheduling. For example, an IAB-node is unable to perform fine-granularity uplink traffic control, such as being unable to perform uplink flow control for each backhaul radio link control (BH RLC) channel or for a routing ID, wherein the routing ID includes a BAP address ID and a BAP path ID; and for another example, when an IAB-node is in a dual connectivity (DC) mode, when congestion occurs in only one cell group in a master cell group (MCG) and a secondary cell group (SCG) (for example, in FIG. 2, uplink congestion occurs in the IAB-node 2 to the IAB-node 3, while congestion does not occur in the IAB-node 2 to the IAB-node 4), the IAB-node 2 is unable to selectively restrict that uplink data of a child node are routed to the congested cell group. In other words, specific routing information of the data of the child node is unclear in scheduling in the above method for alleviating congestion. Therefore, if uplink scheduling is restricted, all data need to be restricted, which will affect other links that are not congested or a BH RLC channel (for example, uplink data from the IAB-node 2 to the IAB-node 3 and uplink data from the IAB-node 2 to the IAB-node 4 in FIG. 2 are all restricted), resulting in low transmission efficiency and waste of resources. The above limitations are uplink scheduling specific, and similar issues do not exist in downlink scheduling.

At least addressed to the above limitations, the embodiment of the first aspect of this disclosure provides a signal transmission and reception method.

Figure 3:
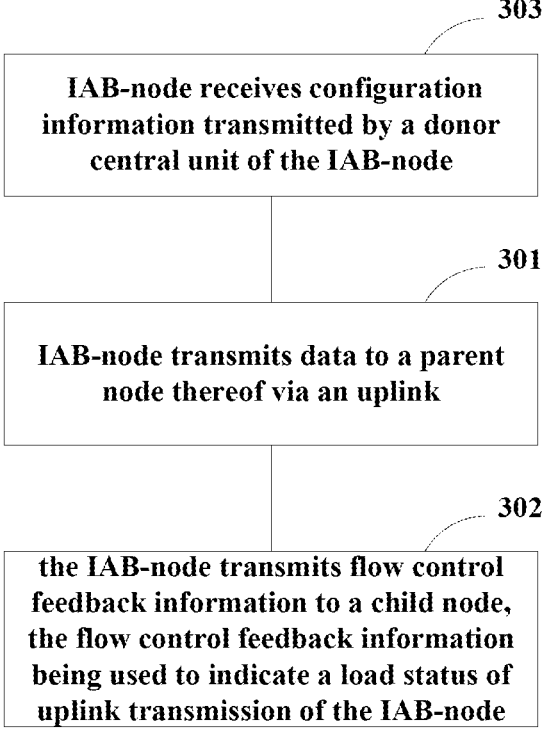
FIG. 3 is a schematic diagram of a signal transmission and reception method of an embodiment of a first aspect of this disclosure.

FIG. 3 is a schematic diagram of a signal transmission and reception method of the embodiment of this disclosure. As shown in FIG. 3, the method includes:

operation 301: an IAB-node transmits data to a parent node thereof via an uplink; and
  operation 302: the IAB-node transmits flow control feedback information to a child node thereof, the flow control feedback information being used to indicate a load status of uplink transmission of the IAB-node.

According to the embodiment of the first aspect of this disclosure, the IAB-node transmits the flow control feedback information to the child node to indicate the load status of IAB uplink transmission. Hence, flows may be controlled at a side of the child node, thereby improving precision of the control and transmission efficiencies of data while alleviating uplink transmission congestion.

Figure 4:
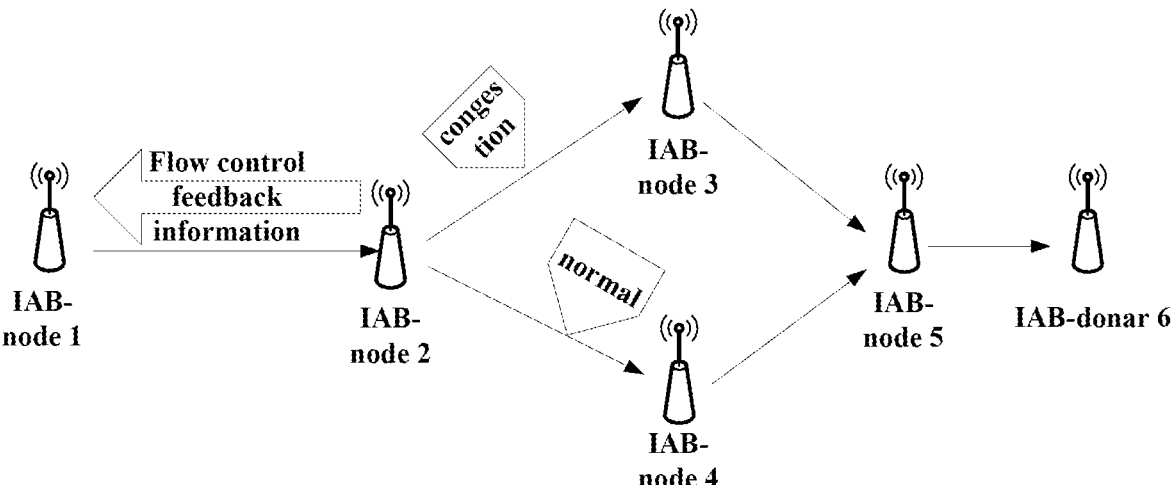
FIG. 4 is a schematic diagram of transmitting by an IAB flow control feedback information to a child node in the embodiment of the first aspect of this disclosure.

FIG. 4 is a schematic diagram of transmitting flow control feedback information by the IAB to the child node in the embodiment of the first aspect of this disclosure.

As shown in FIG. 4, when congestion occurs in an uplink from an IAB-node 2 to an IAB-node 3, for example, a buffer load exceeds a certain threshold, the IAB-node 2 transmits flow control feedback information to its child node (i.e., IAB-node 1) to indicate a load status of uplink transmission from the IAB-node 2 to the IAB-node 3. In addition, as shown in FIG. 4, an uplink from the IAB-node 2 to an IAB-node 4 is in a normal state and no congestion occurs. The IAB network in FIG. 4 also has an IAB-donor 6. And furthermore, explanations of other nodes in FIG. 4 are identical to those in FIG. 2.

In FIG. 4, the operation of transmitting the flow control feedback information by the IAB-node 2 to its child node (i.e., an IAB-node 1) corresponds to operation 302 in FIG. 3.

In subsequent explanations of the embodiment of the first aspect, the IAB of operation 302 is, for example, the IAB-node 2 in FIG. 4.

In at least one embodiment, when the buffer load of the integrated access and backhaul node (such as the IAB-node 2) exceeds a first threshold, or when the integrated access and backhaul node (such as the IAB-node 2) receives a flow control request transmitted by the child node (such as the IAB-node 1), the IAB-DU of the IAB-node 2 transmits the flow control feedback information to the IAB-MT of the IAB-node 1. For example, the IAB-MT of the IAB-node 1 in FIG. 4 may transmit a flow control request to the IAB-DU of the IAB-node 2, and the IAB-DU of the IAB-node 2 transmits the flow control feedback information to the IAB-node 1, wherein the flow control request and the flow control feedback information are both transmitted by a backhaul adaptation protocol control protocol data unit (BAP control PDU).

In at least one embodiment, operation 302 includes: the IAB-DU of the IAB-node (such as the IAB-node 2) generates a backhaul adaptation protocol control protocol data unit (BAP control PDU) for transmitting the flow control feedback information according to a flow control type configured by an F1 application protocol, and transmits the BAP control PDU.

In operation 302, when the F1 application protocol (F1 AP) configures an egress backhaul radio link control (BH RLC) channel of the backhaul adaptation protocol control protocol data unit (BAP control PDU), the BAP control PDU is submitted to the egress BH RLC channel for transmission. A backhaul radio link control channel identification information element (BH RLC CH ID IE) of the egress BH RLC channel is associated with a backhaul adaptation protocol control protocol data unit channel information element (BAP control PDU channel IE) with a value being a first value (for example, the first value is true) (for example, according to TS38.473, the two IEs are in the same entry in the same list). In addition, in operation 302, in case where the F1 AP (F1 application protocol) is not configured with the egress BH RLC channel of the BAP control PDU, the BAP control PDU is submitted to any egress BH RLC channel of an egress link for transmission.

For example, for a BAP entity of the IAB-DU or IAB-donor DU (such as the IAB-node 2), when the buffer load exceeds a certain threshold or when a BAP control PDU for a flow control request is received at a receiver end and flow control feedback is triggered, a transmitter end constructs a BAP control PDU for transmitting flow control feedback information according to the flow control type configured by the F1 AP. The flow control type refers to a granularity, i.e., per BH RLC channel or per routing ID, etc. If the F1 AP configures the egress BH RLC channel of the BAP control PDU, the BAP control PDU is submitted to an egress BH RLC channel of an egress link specified by the F1 AP signaling, and a BH RLC CH ID IE (information element) of the egress BH RLC channel is associated with the BAP control PDU Channel IE with a value that is true; and if the F1 AP does not configure the egress BH RLC channel of the BAP control PDU, the BAP control PDU is submitted to any egress BH RLC channel of the egress link.

In at least one embodiment, in the flow control feedback information transmitted by the IAB-node 2 to the IAB-node 1, the load status of the uplink transmission may be reported at a certain granularity, the granularity being, for example, each existing BH RLC channel or each existing routing ID, etc.

As the uplink buffer status report (BSR) is reported at a granularity of a logical channel group (LCG), the granularity of the flow control information may be increased by one, that is, per LCG, which is beneficial to enhancement of the BSR by the IAB-MT of the child node. For example, in order to achieve flow control feedback for each LCG (i.e., the granularity of the flow control feedback information is per LCG), a protocol data unit type (PDU type) may be added to the BAP sublayer of the IAB-node (e.g., the IAB-node 2), for example, the added PDU type may be flow control feedback at a granularity of a logical channel group (flow control feedback per LCG); in addition, it is also needed to configure the IAB-DU with the flow control type of LCG when the IAB-DU is configured, such as configuring the DU by the IAB-donor central unit (IAB-donor CU).

Table 1 is an example of the PDU type. As shown in Table 1, when the PDU type is 0000, 0001, 0100, the granularity of flow control feedback information (i.e., the flow control type) is per BH RLC channel, per routing ID, per LCG.

TABLE 1

| Bit | Description |
| --- | --- |
| 0000 | Flow control feedback per BH RLC channel |
| 0001 | Flow control feedback per routing ID |

TABLE 1-continued

| Bit | Description |
| --- | --- |
| 0010 | Flow control feedback polling |
| 0011 | BH RLF indication |
| 0100 | Flow control feedback per LCG |
| 0100-1111 | Reserved |

In at least one embodiment, contents of the flow control feedback information transmitted from the IAB-node 2 to the IAB-node 1 in operation 302 include: an available buffer size, the available buffer size being a maximum flow which should be transmitted by a transmitter end of the IAB-node 1; and/or an available data rate, the available data rate being a maximum flow data rate which should be used by the transmitter end of IAB-node 1, and being also referred to as a desired data rate; and/or information used for indicating that uplink congestion occurs, for example, the information may be a piece of simple indication information for indicating that uplink congestion occurs in the IAB-node 2.

In addition, the contents of the flow control feedback information may further include congestion clearance (leaving) indication information. The congestion clearance indication information is used for indicating that the uplink of the integrated access and backhaul node (such as IAB-node 2) is in a normal state. For example, in a case where the IAB-node 2 receives a flow control request, if the uplink recovers from a congestion status to the normal state (for example, the buffer load is less than a certain threshold), the contents of the flow control feedback information transmitted by the IAB-node 2 to the IAB-node 1 may include the congestion clearance indication information. In at least one embodiment, as shown in FIG. 3, the method further includes:

operation 303: the integrated access and backhaul node (such as the IAB-node 2) receives configuration information transmitted by a donor central unit of the IAB-node 2, the configuration information being used to configure a flow control type and/or contents of the flow control feedback information.

For example, the central unit (CU) of an IAB-donor 6 shown in FIG. 4, i.e., the IAB-donor central unit (IAB-donor CU), configures the flow control type for the DU of the IAB-node 2 via the F1 AP protocol (such as specified in TS38.473), for example, what is reported by the flow control feedback information is, per BH RLC channel, or per routing ID, or per LCG, etc.; and furthermore, the IAB-donor CU may configure contents of flow control feedback information for the DU of IAB-node 2 via the F1 AP protocol (such as specified in TS38.473). For example, the contents of flow control feedback information may be the available buffer size, the available data rate, or the indication information for indicating that congestion occurs in the uplink.

It should be noted that FIG. 3 only schematically illustrates the embodiment of this disclosure; however, this disclosure is not limited thereto. For example, an order of execution of the operations may be appropriately adjusted, and furthermore, some other operations may be added, or some operations therein may be reduced. And appropriate variants may be made by those skilled in the art according to the above contents, without being limited to what is contained in FIG. 3.

According to the embodiment of the first aspect of this disclosure, the IAB-node transmits the flow control feedback information to the child node to indicate the load status of IAB uplink transmission. Hence, flows may be controlled at a side of the child node, thereby improving precision of the control and transmission efficiencies of data while alleviating uplink transmission congestion.

Embodiment of a Second Aspect

At least addressed to the same problem as the embodiment of the first aspect, the embodiment of the second aspect of this disclosure provides a signal transmission and reception method, corresponding to the method of the embodiment of the first aspect.

The signal transmission and reception method of the embodiment of the second aspect of this disclosure shall be described below from the side of the child node (i.e., the IAB-node 1) in FIG. 4 by taking the scenario in FIG. 4 as an example.

Figure 5:
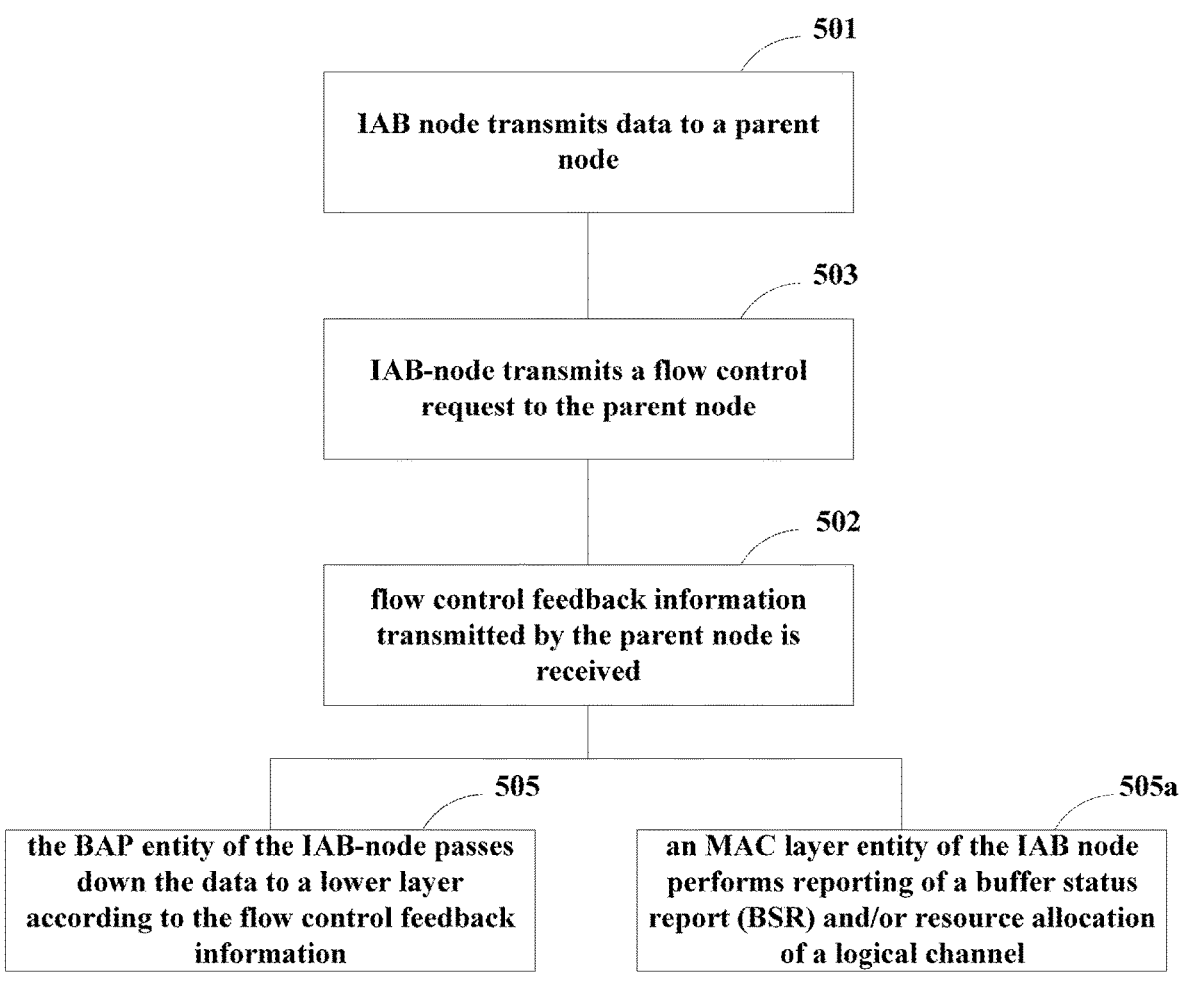
FIG. 5 is a schematic diagram of a signal transmission and reception method of an embodiment of a second aspect of this disclosure.

FIG. 5 is a schematic diagram of a signal transmission and reception method of the embodiment of the second aspect of this disclosure. As shown in FIG. 5, the method includes:

operation 501: an integrated access and backhaul (IAB) node transmits data to a parent node; and operation 502: flow control feedback information transmitted by the parent node is received, the flow control feedback information being used to indicate a load status of uplink transmission of the parent node.

In the embodiment of the second aspect, the IAB-node may be the IAB-node 1 shown in FIG. 4, and the parent node of the IAB-node may be the IAB-node 2 shown in FIG. 4.

In operation 502, contents of the flow control feedback information include: an available buffer size; and/or an available data rate; and/or indication information used for indicating congestion. The indication information may report a load status of the uplink transmission of the parent node at a certain granularity.

In addition, the contents of the flow control feedback information may include congestion clearance (leaving) indication information. The congestion clearance indication information is used to indicate that the uplink of the integrated access and backhaul node (such as IAB-node 2) is in a normal state. For example, in a case where the IAB-node 2 receives a flow control request, if the uplink is recovered from the congestion status to the normal state (for example, the buffer load is less than a certain threshold), the contents of the flow control feedback information transmitted by the IAB-node 2 to the IAB-node 1 may further include the congestion clearance indication information.

Reference may be made to the embodiment of the first aspect for explanations of the contents and granularity of flow control feedback information.

As shown in FIG. 5, in at least one embodiment, the method further includes:

operation 503: the IAB-MT of the integrated access and backhaul node (such as the IAB-node 1) transmits a flow control request to the IAB-DU of the parent node (such as the IAB-node 2).

After transmitting the flow control request (i.e., after operation 503), the IAB-MT of the IAB-node 1 receives the flow control feedback information.

Operation 503 may include: the IAB-MT of the IAB-node 1 generates a backhaul adaptation protocol control protocol data unit (BAP control PDU) for transmitting the flow control request, and transmits the BAP control PDU.

In operation 503, in a case where the F1 application protocol (F1 AP) has configured an egress backhaul radio link control (BH RLC) channel for the BAP control PDU, the BAP control PDU is submitted to the configured BH RLC channel. Backhaul information information element (BH Information IE) containing an egress backhaul radio link control channel identification information element (egress BH RLC CH ID IE) to which the BH RLC channel corresponds is associated with a non-user plane traffic type information element (non-UP traffic type IE) with a value being the BAP control PDU.

In operation 503, in a case where the F1 application protocol has not configured the egress BH RLC channel for the BAP control PDU, the BAP control PDU is submitted to any egress BH RLC channel of an egress link.

For example, for a BAP entity of the MT of the IAB-node 1, when it is needed to transmit a flow control request on the egress link, the transmitter end constructs a BAP control PDU for the flow control request, wherein if the F1 AP configures the egress BH RLC channel of the BAP control PDU, the BAP control PDU is submitted to the egress BH RLC channel of the egress link specified in the F1 AP signaling, and the BH Information IE containing the egress BH RLC CH ID IE to which the egress BH RLC channel corresponds is associate with the non-UP traffic type IE with the value being the BAP control PDU; and if the F1 AP does not configure the egress BH RLC channel of the BAP control PDU, the BAP control PDU is submitted to any egress BH RLC channel on the egress link.

In this disclosure, IAB-node 1 may perform enhancement processing on the MT of the IAB-node 1 upon receiving the flow control feedback information transmitted by the parent node, thereby achieving uplink flow control at the side of the IAB-node 1.

In at least some embodiments, the enhancement processing may be performed on a BAP sublayer of the IAB-node 1.

As shown in FIG. 5, the method further includes:

operation 505: the BAP entity of the IAB-node passes down the data to a lower layer according to the flow control feedback information. A specific action is to submit the data to be transmitted to an egress BH RLC channel of a selected egress link.

In operation 505, a BAP entity of the MT of the IAB-node 1 (i.e., an IAB-MT) may have a function of transmitter end data buffering. Thus, when the BAP entity of the IAB-MT receives a BAP service data unit (SDU) from an upper layer or receives a BAP data packet from a receiver end of the BAP entity of the IAB-DU of the same IAB-node (i.e., the IAB-node 1), the transmitter end of the BAP sublayer of the IAB-MT buffers the data, and according to the flow control feedback information, determines which data are passed down to the lower layer, the lower layer being, for example, an RLC layer.

In determining which data are passed down to the lower layer according to the previously received flow control feedback information (e.g. received in operation 502), the following method may be adopted: the transmitter end of the BAP sublayer of the IAB-MT buffers at least a part of data to be mapped to the congested BH RLC channel (i.e., contained in the flow control feedback information) or at least a part of data corresponding to a congested routing ID, and does not transmit these data to the lower layer, that is, in the BAP sublayer performing routing ID selection or BH RLC channel mapping, operations are only performed on data other than these data.

Operation 505 shall be described below in detailed for different flow control feedback information received by the IAB-MT (i.e., the MT of the IAB-node 1).

Case 1.1a: in a case where the flow control feedback information indicates a congestion status at a granularity of a BH RLC channel, the BAP entity of the IAB-MT does not pass down data mapped to an egress BH RLC channel indicated as being in a congestion status to the lower layer.

For example, if the flow control feedback information received by the IAB-MT is a simple indication and the granularity is a BH RLC channel (for example, the flow control feedback information indicates that one or some BH RLC channels are in a congested status), the BAP sublayer of the IAB-MT buffers the data mapped to the BH RLC channel indicated as being congestion and does not transmit the data to the lower layer.

In addition, mapping of data to a BH RLC channel is explained as follows: the BAP entity performs routing selection upon receiving the data, then selects a BH RLC channel according to a mapping relationship between the data and the BH RLC channel, and finally submits the data to the selected BH RLC channel (i.e., passes down the data to the lower layer). In the following explanations of this disclosure, "data being mapped to a BH RLC channel" refers to "there exists a mapping relationship between the data and the BH RLC channel".

Case 1.1b: in the case where the flow control feedback information indicates a congestion status at a granularity of a routing ID, the BAP entity of the MT of the IAB-node 1 (i.e., the IAB-MT) does not pass down data with a backhaul adaptation protocol (BAP) header containing a routing ID indicated as being in a congested status to the lower layer. The BAP header refers to a BAP header of data needing to be transmitted (such as data received from the upper layer or data received from a DU end of the IAB-node 1).

For example, if the received flow control feedback information is a simple indication and the feedback granularity is a routing ID (for example, the flow control feedback information indicates that one or some routing IDs are in a congestion status), the BAP sublayer of the IAB-MT buffers data with a BAP header containing a routing ID indicated as being congestion and does not pass down the data to the lower layer.

Case 1.2a: in the case where the flow control feedback information indicates the available buffer size at a granularity of a BH RLC channel, the BAP entity of the MT of the IAB-node 1 does not pass down data more than a buffer size to which the BH RLC channel corresponds in data mapped to each BH RLC channel in the flow control feedback information to the lower layer.

For example, if the content of the received flow control feedback information is the available buffer size and the granularity is the BH RLC channel (for example, the flow control feedback information indicates buffer size(s) of one or some BH RLC(s)), for each BH RLC channel in the flow control feedback information, the BAP sublayer of the IAB-MT buffers data more than an available buffer size to which the BH RLC channel corresponds in data mapped to the BH RLC channels and does not pass down the data to the lower layer, that is, a size of the data passed down to the lower layer is: min (an actual size of the data, the available buffer size of the BH RLC channel indicated in the flow control feedback).

Case 1.2b: in the case where the flow control feedback information indicates the available buffer size at a granularity of a routing ID, for each routing ID in the flow control feedback information, the BAP entity of the MT of the IAB-node 1 does not pass down data more than an available buffer size to which a routing ID corresponds in data with a BAP header containing the routing ID to the lower layer.

For example, if the content of the received flow control feedback information is an available buffer size and the feedback granularity is a routing ID (for example, the flow control feedback information indicates buffer size(s) of one or some routing ID(s)), for each routing ID reported in the flow control feedback information, the BAP sublayer of the IAB-MT buffers data more than an available buffer size to which the routing ID corresponds in data with a BAP header containing the routing ID and does not pass down the data to the lower layer, that is, a size of the data passed down to the lower layer is: min (an actual size of the data, the available buffer size of the routing IDs indicated in the flow control feedback).

Case 1.3a: in the case where the flow control feedback information indicates the available data rate at a granularity of a BH RLC channel, the BAP entity of the IAB-node 1 passes down data mapped to each BH RLC channel in the flow control feedback information to the lower layer at a rate not greater than the available data rate of the BH RLC channel indicated by the flow control feedback information.

For example, if the content of the received flow control feedback information is the available data rate and the feedback granularity is the BH RLC channel (for example, the flow control feedback information indicates available data rate(s) of one or some BH RLC(s)), for each BH RLC channel reported in the flow control feedback information, the BAP sublayer of the IAB-MT pass down data mapped to the BH RLC channel to the BH RLC channels at a rate not greater than available data rate of the BH RLC channel indicated in the flow control feedback information (i.e. performing downlink transmission).

Case 1.3b: in the case where the flow control feedback information indicates the available data rate at a granularity of a routing ID, for each routing ID in the flow control feedback information, the BAP entity of the IAB-node 1 passes down data with a BAP header containing the routing ID to the lower layer at a rate not greater than the available data rate of the routing ID indicated by the flow control feedback information.

For example, if the content of the received flow control feedback information is the available data rate and the feedback granularity is a routing ID (for example, the flow control feedback information indicates available data rate(s) of one or some routing ID(s)), for each routing ID reported in the flow control feedback information, the BAP sublayer of the IAB-MT passes down data with a BAP header containing the routing ID to the lower layer at a rate not greater than the available data rate of the routing ID indicated by the flow control feedback information.

In addition, in at least one embodiment, in the case where the IAB-node 1 receives congestion clearance indication information from the parent node (such as the IAB-node 2) (such as operation 504 in FIG. 5), the BAP entity of the IAB-node 1 may pass down the data to the lower layer according to the congestion clearance indication information. For example, if the IAB-node 1 receives the congestion clearance indication information (for example, the congestion clearance indication information indicates that one or more BH RLC channel(s) or routing ID(s) is/are in a normal status), for the congestion clearance indication information, corresponding transmission of data (such as data mapped to the BH RLC channel, or data with a BAP header containing the routing ID) is restored to be normal, that is, the transmitter end of the BAP sublayer of the IAB-MT passes down the data to the lower layer according to an existing standard (such as TS38.340).

Enhancement processing of the BAP sublayer of the IAB-node 1 is illustrated above. Therefore, uplink flow control may be achieved at the side of IAB-node 1 in a simple way.

In at least some other embodiments, the enhancement processing may also be performed on an MAC (media access control) layer of the MT of the IAB-node 1.

As shown in FIG. 5, the method further includes:
operation 505a: an MAC layer entity of the IAB node performs reporting of a buffer status report (BSR) and/or resource allocation of a logical channel.

In FIG. 5, operation 505 is enhancement processing on the BAP sublayer, and operation 505a is enhancement processing on the MAC layer. In this disclosure, operation 505a may be used to replace operation 505, i.e., one of operation 505 and operation 505a exists; or, both operations 505a and 505 exist, that is, enhancement processing is performed on both the BAP sublayer and MAC layer.

Operation 505a shall be described below in detailed.

In operation 505a, behaviors of the MAC layer after the IAB-MT receives the flow control feedback information are enhanced to complete uplink flow control, in which a buffer status report (BSR) process and a logical channel prioritization (LCP) process at the MAC layer are specifically concerned.

A function of the BSR is to notify the gNB/IAB-DU of a situation of data to be transmitted in a current buffer of the UE/IAB-MT, and the gNB/IAB-DU may allocate an uplink resource to the UE/IAB-MT according to an amount of data of the UE/IAB-MT reported by the BSR. In operation 505a, enhancement for the BSR process includes: for data mapped to a congested routing ID or BH RLC channel or data corresponding to an LCG indicated as being congestion, the IAB-MT does not include (or calculate) buffer information of these data into the BSR. In addition, behaviors of a regular BSR, periodic BSR and padding BSR defined in standards are unchanged, that is, if the buffer information of these data is not included (or calculated) in the BSR, it is deemed that these data are not available for transmission, and other processes remain unchanged.

Within each transmission time length (for example, a transmission time length of an NR system may be micro slots, one slot, or a plurality of slots), the UE/IAB-MT may transmit one MAC PDU only, but there may possibly be RLC SDUs from a plurality of logical channels that need to be placed on this MAC PDU. In order to prioritize RLC a plurality of logical channel SDUs, logical channel prioritization (LCP) needs to be performed. In operation 505a, the enhancement for the LCP process includes: in a step of logical channel resource allocation, for data not included in the BSR, or for data mapped to a congested routing ID or BH RLC channel, or data corresponding to the LCG indicated as being congestion, resource allocation is not performed on the data in the LCP process. Other LCP processes, such as priority processing, and logical channel multiplexing, etc., remain unchanged.

According to different flow control feedback information received by the IAB-MT (i.e., the MT of the IAB-node 1), operation 505a may include the following cases:

Case 2.1a: in the case where the flow control feedback information indicates a congestion status at the granularity of a BH RLC channel, the MAC entity of the IAB-node 1 does not allocate resources to a logical channel corresponding to the BH RLC channel indicated as being congestion; and/or, the buffer status report (BSR) reported by the MAC entity of the IAB-node 1 does not include the logical channel corresponding to the BH RLC channel indicated as being congestion.

For example, if the received flow control feedback information is a simple indication and the feedback granularity is a BH RLC channel (for example, the flow control feedback information indicates that one or some BH RLC channel(s) is/are in a congested status), the BSR of the IAB-MT does not include the logical channel corresponding to the BH RLC channel indicated as being congestion. That is, in calculating a buffer size of each LCG, a buffer of the logical channels corresponding to the congested BH RLC channel is assumed to be 0; in addition, during the LCP process, resources are not allocated to this logical channel.

Case 2.1b: in the case where the flow control feedback information indicates the congestion status at a granularity of a routing ID, the MAC entity of the MT of the IAB-node 1 does not allocate resources for data with a BAP header containing a routing ID indicated as being congestion, and/or, the BSR reported by the MAC entity of the IAB-node 1 does not include a buffer size of data with a BAP header containing a routing ID indicated as being congestion.

For example, if the received flow control feedback information is a simple indication and the feedback granularity is the routing ID (for example, the flow control feedback information indicates that one or some routing ID(s) is/are in a congestion status), the BAP sublayer of the IAB-MT indicates the data with the BAP header containing a routing ID indicated as being congestion to the MAC layer (or, the MAC layer reads the BAP header, and other similar operations), and the MAC layer does not include the buffer size of the data in the BSR; in addition, resources are not allocated for these data during the LCP process.

Case 2.1c: in the case where the flow control feedback information indicates the congestion status at a granularity of a logical channel group (LCG), the MAC entity of the MT of the IAB-node 1 does not allocate resources for a logical channel group (LCG) indicated as being congestion; and/or, the buffer status report (BSR) reported by the MAC entity of the IAB-node 1 does not include a logical channel group (LCG) indicated as being congestion.

For example, if the content of the received flow control feedback information is a simple indication and the feedback granularity is an LCG (for example, the flow control feedback information indicates that one or some LCG(s) is/are in a congestion status), the BSR of the IAB-MT does not include the LCGs indicated as being congestion; in addition, during the LCP process, resources are not allocated for the logical channels within the LCG.

Case 2.2a: in the case where the flow control feedback information indicates the available buffer size at a granularity of a BH RLC channel, a resource allocated by the MAC entity of the IAB-node for a logical channel corresponding to the BH RLC channel included in the flow control feedback information does not exceed the available buffer size; and/or, the MAC entity of the IAB-node 1 calculates a buffer size of a logical channel corresponding to the BH RLC channel in the reported BSR based on the available buffer size not greater than each the BH RLC channel in the flow control feedback information.

For example, if the content of the received flow control feedback information is an available buffer size and the feedback granularity is a BH RLC channel (for example, the flow control feedback information indicates available buffer size(s) of one or some BH RLC channel(s)), for a logical channel corresponding to each BH RLC channel in the flow control feedback information, in calculating the buffer size of the logical channel for preparing a BSR, the IAB-MT uses a smaller one in an actual buffer size and an available buffer size of the BH RLC channel indicated in the flow control feedback, such as min (the actual buffer size, the available buffer size of the BH RLC channel indicated in the flow control feedback); in addition, during the LCP process, a resource allocated to the logical channel does not exceed the available buffer size of the BH RLC channel indicated in the flow control feedback.

Case 2.2b: in the case where the flow control feedback information indicates the available buffer size at a granularity of a routing ID, for each routing ID in the flow control feedback information, resources allocated by the MAC entity for data indicated as the routing IDs do not exceed the available buffer size of the routing ID indicated by the flow control feedback information; and/or, for each routing ID in the flow control feedback information, the buffer size belonging to the routing ID in the BSR for reporting calculated by the MAC entity do not exceed the available buffer size of the each routing ID indicated by the flow control feedback information.

For example, if the content of the received flow control feedback information is an available buffer size and the feedback granularity is a routing ID (for example, the flow control feedback information indicates available buffer size(s) of one or some routing ID(s)), the BAP sublayer of the IAB-MT indicates data with a BAP header containing a routing ID indicated being contained in the flow control feedback information to the MAC layer. For each routing ID reported in the flow control feedback information, when the IAB-MT calculates the BSR, in a sum of buffer sizes of LCGs, the buffer size belonging to the routing ID does not exceed an indicated available buffer size; in addition, during the LCP process, a resource is not allocated for data packets that are not included in the calculation of the BSR, that is, a resource allocated for data corresponding to each routing ID does not exceed the indicated available buffer size of the routing ID.

Case 2.2c: in the case where the flow control feedback information indicates the available buffer size at a granularity of a logical channel group (LCG), resources allocated by the MAC entity to a logical channel group (LCG) included in the flow control feedback information (i.e., a sum of resources of all logical channels in the LCG) do not exceed the available buffer size of the flow control feedback information; and/or, for each logical channel group (LCG) in the flow control feedback information, the MAC entity calculates a buffer size of a buffer status report for reporting based on a condition that the buffer size is not greater than the available buffer size of the logical channel group (LCG) in the flow control feedback information.

For example, if the content of the received flow control feedback information is an available buffer size and the feedback granularity is an LCG (for example, the flow control feedback information indicates available buffer size(s) of one or some LCG(s)), for each LCG reported in the flow control feedback information, in calculating the buffer size of the LCG for preparing a BSR, the IAB-MT uses a smaller one in an actual buffer size and an available buffer size of the LCG indicated in the flow control feedback, such as min (the actual buffer size, the available buffer size of the LCG indicated in the flow control feedback); in addition, during the LCP process, a sum of resources allocated for logical channels in the LCG does not exceed the available buffer size of the LCG indicated in the flow control feedback.

Case 2.3a: in the case where the flow control feedback information indicates the available data rate, the MAC entity of the IAB-node 1 calculates the available buffer size according to the available data rate and a time interval between two times of transmitting adjacent buffer status reports (BSRs), calculates a buffer size of a BSR for reporting according to the available buffer size, and performs resource allocation.

For example, if the content of the received flow control feedback is an available data rate (such as an available data rate(s) of one or more routing ID(s), or an available data rate(s) of one or more BH RLC(s), or an available data rate(s) of one or more LCG(s)), the available data rate may be converted into an available buffer size, such as by using a formula: an available buffer size=an available data rate×a time interval between two times of transmitting BSRs. After calculating the available buffer size, both the BSR process and LCP process may be processed by using the same operations as case 2.2a, or 2.2b, or 2.2c.

Case 2.3b: in the case where the flow control feedback information indicates the available data rate at a granularity of a BH RLC channel, during the LCP process, a prioritized bit rate (PBR) of a logical channel corresponding to the BH RLC may be set to be the smaller one in the original PBR and the available data rate indicated in the flow control feedback information, such as min (the original PBR, the available data rate of the BH RLC channel indicated in the flow control feedback information).

Case 2.3c: in the case where the flow control feedback information indicates the available data rate at a granularity of a logical channel group (LCG), during the LCP process, the MAC entity of the IAB-node 1 sets prioritized bit rates (PBRs) of each logical channel in the logical channel group reported in the flow control feedback information to be a smaller value in the original PBR of the logical channel and the available data rate/K. For example, such as min (the original PBR, the available data rate of the LCG reported by the flow control feedback information/K); where, K is a natural number, denoting the number of logical channels in the LCG.

In addition, in at least one embodiment, in the case where the IAB-node 1 receives the congestion clearance indication information (for example, the flow control feedback information includes the congestion clearance indication information) from the parent node (such as the IAB-node 2), the MAC entity of the IAB-node 1 may execute the LCP process and/or the BSR process according to the congestion clearance indication information. For example, if the IAB-node 1 receives the congestion clearance indication information (for example, the congestion clearance indication information indicates that one or more BH RLC channel(s) or routing ID(s) is/are in a normal status), for the congestion clearance indication information, transmission of corresponding data (such as data mapped to the BH RLC channel, or data with a BAP header containing the routing ID) is recovered to be normal, that is, the MAC entity of the IAB-MT executes the BSR process and LCP process according to existing standards (such as TS38.321).

According to the embodiment of the second aspect of this disclosure, the IAB-node receives the flow control feedback information used to indicate the load status of the uplink of the parent node. Hence, uplink flow control may be controlled by the IAB-node, thereby improving precision of control and transmission efficiency of data while alleviating congestion of uplink transmission; and furthermore, the MT of the IAB-node may perform enhancement processing according to the flow control feedback information, thereby achieving uplink flow control.

Embodiment of a Third Aspect

The embodiment of this disclosure provides a signal transmission and reception apparatus. The apparatus may be, for example, a distributed unit (DU) of an integrated access and backhaul node, or may be one or some components or assemblies configured in the DU of the integrated access and backhaul node, the integrated access and backhaul node being, for example, the IAB-node 2 in FIG. 4. The apparatus corresponds to the method in the embodiment of the first aspect.

Figure 6:
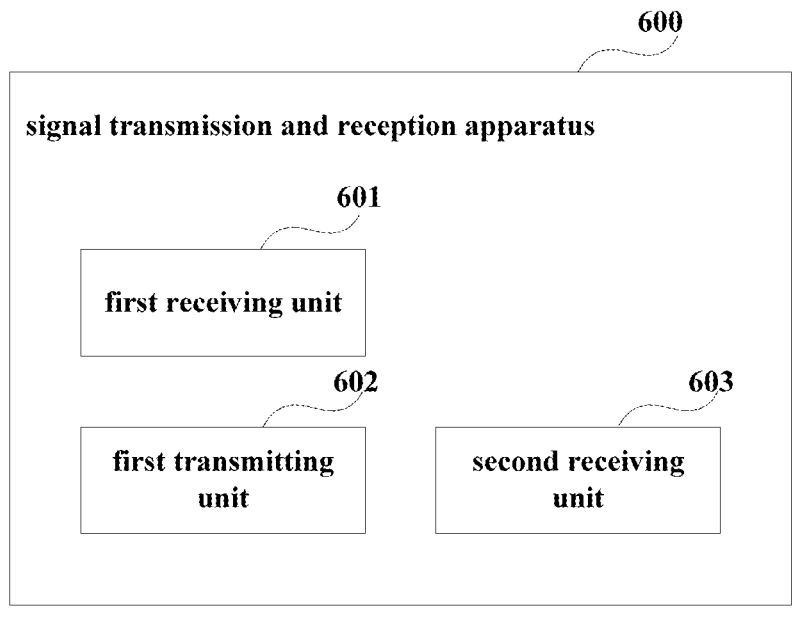
FIG. 6 is a schematic diagram of a signal transmission and reception apparatus of an embodiment of a third aspect of this disclosure.

FIG. 6 is a schematic diagram of the signal transmission and reception apparatus of the embodiment of this disclosure. As shown in FIG. 6, a signal transmission and reception apparatus 600 includes:

a first receiving unit 601 configured to receive uplink data for transmitting to a parent node of an integrated access and backhaul (IAB) node via an uplink (for example, the uplink data is transmitted by an MT of the IAB-node 2); and a first transmitting unit 602 configured to transmit flow control feedback information to an MT of a child node (the IAB-node 1) of the IAB-node 2, the flow control feedback information being used to indicate a load status of uplink transmission of the integrated access and backhaul node (the IAB-node 2).

When the buffer load of the IAB-node 2 exceeds a first threshold, or when the DU of the IAB-node 2 receives a flow control request transmitted by the MT of the child node, the first transmitting unit 602 transmits the flow control feedback information to the MT of the child node.

In at least one embodiment, the first transmitting unit 602 generates a backhaul adaptation protocol control protocol data unit (BAP control PDU) for transmitting the flow control feedback information according to a flow control type configured by an F1 application protocol, and transmits the backhaul adaptation protocol control protocol data unit.

For example, when the F1 application protocol configures an egress radio link control (BH RLC) channel of the backhaul adaptation protocol control protocol data unit (BAP control PDU), the backhaul adaptation protocol control protocol data unit (BAP control PDU) is submitted to the egress radio link control (BH RLC) channel. A backhaul radio link control channel identification information element (BH RLC CH ID IE) of the egress BH RLC channel is associated with a backhaul adaptation protocol control protocol data unit channel information element (BAP control PDU channel IE) with a value being a first value.

For another example, in a case where the F1 application protocol has not configured an egress backhaul radio link control (BH RLC) channel for a backhaul adaptation protocol control protocol data unit (BAP control PDU), the backhaul adaptation protocol control protocol data unit (BAP control PDU) is submitted to any egress backhaul radio link control (BH RLC) channel of an egress link.

A backhaul adaptation protocol (BAP) sublayer of the integrated access and backhaul node includes a first protocol data unit type (PDU type), such as flow control feedback at a granularity of a logical channel group, that is, when the configured flow control is flow control performed at a granularity of a logical channel group (LCG), the first transmitting unit 602 generates the flow control feedback information at a reporting granularity of a logical channel group (LCG) by using the first protocol data unit type (PDU type).

In at least one embodiment, contents of the flow control feedback information include: an available buffer size, and/or an available data rate, and/or indication information used for indicating congestion.

In at least one embodiment, the contents of the flow control feedback information may further include congestion clearance indication information, the congestion clearance indication information being used for indicating that the uplink of the integrated access and backhaul node is in a normal state.

As shown in FIG. 6, the apparatus 600 further includes:

a second receiving unit 603 configured to receive configuration information transmitted by a donor central unit of the integrated access and backhaul node (IAB-donor CU), the configuration information being used to configure a flow control type and/or the contents of the flow control feedback information.

Reference may be made to corresponding explanations of the operations in the embodiment of the first aspect for detailed explanations of the units in apparatus 600.

According to the embodiment of the third aspect of this disclosure, the IAB-node transmits the flow control feedback information to the child node to indicate the load status of IAB-node uplink transmission. Hence, flows may be controlled at a side of the child node, thereby improving precision of the control and transmission efficiencies of data while alleviating uplink transmission congestion.

Embodiment of a Fourth Aspect

The embodiment of this disclosure provides a signal transmission and reception apparatus. The apparatus may be, for example, a mobile termination (MT) of an IAB node taken as a child node, or may be one or some components or assemblies configured in the MT of the IAB node taken as a child node. The IAB node taken as a child node is, for example, the IAB-node 1 in FIG. 4, and a parent node thereof is the IAB-node 2 in FIG. 4. The signal transmission and reception apparatus corresponds to the signal transmission and reception method in the embodiment of the second aspect.

Figure 7:
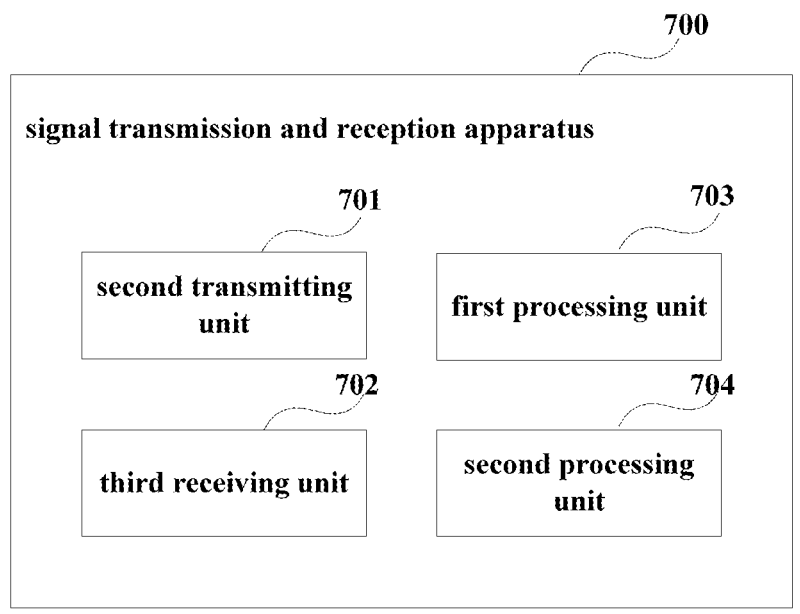
FIG. 7 is a schematic diagram of a signal transmission and reception apparatus of an embodiment of a fourth aspect of this disclosure.

FIG. 7 is a schematic diagram of the signal transmission and reception apparatus in the embodiment of the fourth aspect. As shown in FIG. 7, a signal transmission and reception apparatus 700 includes:

a second transmitting unit 701 configured to transmit data to a DU of the parent node; and a third receiving unit 702 configured to receive flow control feedback information transmitted by the DU of the parent node, the flow control feedback information being used to indicate a load status of uplink transmission of the parent node.

In at least one embodiment, the second transmitting unit 701 further transmits a flow control request to the DU of the parent node, wherein the third receiving unit 702 receives the flow control feedback information after the flow control request is transmitted.

That the second transmitting unit 701 transmits the flow control request to the DU of the parent node includes:

generating a backhaul adaptation protocol control protocol data unit (BAP control PDU) for transmitting the flow control request, and transmitting the backhaul adaptation protocol control protocol data unit.

For example, when the F1 application protocol configures an egress radio link control (BH RLC) channel of the backhaul adaptation protocol control protocol data unit (BAP control PDU), the backhaul adaptation protocol control protocol data unit (BAP control PDU) is submitted to the egress radio link control (BH RLC) channel. A backhaul information information element (BH Information IE) containing an egress backhaul radio link control channel identification information element (egress BH RLC CH ID IE) to which the BH RLC channel corresponds is associated with a non-user plane traffic type information element (non-UP traffic type IE) with a value being the BAP control PDU.

For another example, if the F1 application protocol does not configure the egress BH RLC channel of the BAP control PDU, the BAP control PDU is submitted to any egress BH RLC channel of an egress link.

In at least one embodiment, contents of the flow control feedback information include: an available buffer size, and/or an available data rate, and/or indication information used for indicating congestion.

In at least one embodiment, the contents of the flow control feedback information may further include congestion clearance indication information, the congestion clearance indication information being used for indicating that the uplink of the parent node is in a normal state.

In at least some embodiments, as shown in FIG. 7, the apparatus 700 further includes:

a first processing unit 703 configured in a backhaul adaption protocol (BAP) entity of the integrated access and backhaul (IAB) node and configured to pass down data to a lower layer according to the flow control feedback information.

In a case where the flow control feedback information indicates a congestion state by taking a backhaul radio link control (BH RLC) channel as a granularity, the first processing unit 703 does not pass down data mapped to an egress backhaul radio link control (BH RLC) channel indicated as being in a congestion status to the lower layer.

In a case where the flow control feedback information indicates a congestion state by taking a routing ID as a granularity, first processing unit 703 does not pass down data with a backhaul adaption protocol (BAP) header containing a routing ID indicated as being in a congestion status to the lower layer.

In a case where the flow control feedback information indicates an available buffer size by taking a backhaul radio link control (BH RLC) channel as a granularity, the first processing unit 703 does not pass down data more than the available buffer size corresponding to the backhaul radio link control (BH RLC) channel in the data mapped to each backhaul radio link control (BH RLC) channel in the flow control feedback information to the lower layer.

In a case where the flow control feedback information indicates an available buffer size by taking a routing ID as a granularity, for a routing ID in the flow control feedback information, the first processing unit 703 does not pass down data more than the available buffer size corresponding to the routing ID in data with a BAP header containing the routing ID to the lower layer.

In a case where the flow control feedback information indicates an available data rate by taking a backhaul radio link control (BH RLC) channel as a granularity, the first processing unit 703 passes down data mapped to each backhaul radio link control (BH RLC) channel in the flow control feedback information to the lower layer at a rate not greater than the available data rate of the BH RLC channel indicated by the flow control feedback information.

In a case where the flow control feedback information indicates an available data rate by taking a routing ID as a granularity, for a routing ID in the flow control feedback information, the first processing unit 703 passes down data with a BAP header containing the routing ID to the lower layer at a rate not greater than the available data rate of the routing ID indicated by the flow control feedback information.

In a case where the integrated access and backhaul node receives congestion clearance indication information from the parent node, the first processing unit 703 passes down data to the lower layer according to the backhaul node receives congestion clearance indication information.

In at least some other embodiments, as shown in FIG. 7, the apparatus 700 further includes:

a second processing unit 704 configured in an MAC layer entity of the IAB-node and configured to perform reporting of a buffer status report (BSR) and/or resource allocation of a logical channel according to the flow control feedback information.

In a case where the flow control feedback information indicates a congestion status by taking a BH RLC channel as a granularity, the second processing unit 704 does not allocate resources to a logical channel corresponding to a BH RLC channel indicated as being congestion, and/or, a buffer status report (BSR) reported by the second processing unit 704 does not include a logical channel corresponding to a BH RLC channel indicated as being congestion.

In a case where the flow control feedback information indicates a congestion status by taking a routing ID as a granularity, the second processing unit 704 does not allocate resources for data with a backhaul adaptation protocol (BAP) header containing a routing ID indicated as being in a congestion status, and/or, the buffer status report (BSR) reported by the second processing unit 704 does not include a buffer size of the data with a backhaul adaptation protocol (BAP) header containing a routing ID indicated as being in a congestion status.

In a case where the flow control feedback information indicates a congestion status by taking a logical channel group (LCG) as a granularity, the second processing unit 704 does not allocate resources to a logical channel group (LCG) indicated as being in a congestion status, and/or, the buffer status report (BSR) reported by the second processing unit 704 does not include the logical channel group (LCG) indicated as being in a congestion status.

In a case where the flow control feedback information indicates an available buffer size by taking a backhaul radio link control (BH RLC) channel as a granularity, a resource allocated by the second processing unit 704 for a logical channel corresponding to the backhaul radio link control (BH RLC) channel contained in the flow control feedback information does not exceed the available buffer size, and/or, the second processing unit 704 calculates a buffer size of a logical channel to which the BH RLC channel in the buffer status report used for reporting corresponds according to a condition that the buffer size is not greater than the available buffer size of each backhaul radio link control (BH RLC) channel in the flow control feedback information.

In a case where the flow control feedback information indicates an available buffer size by taking a routing ID as a granularity, for each routing ID in the flow control feedback information, a resource allocated by the second processing unit 704 for data indicated as being the routing ID does not exceed the available buffer size of the routing size indicated by the flow control feedback information, and/or, for each routing ID in the flow control feedback information, a buffer size in the buffer status report used for reporting calculated by the second processing unit 704 does not exceed the available buffer size of the routing ID indicated by the flow control feedback information.

In a case where the flow control feedback information indicates an available buffer size by taking a logical channel group (LCG) as a granularity, resources allocated by the second processing unit 704 for a logical channel group (LCG) contained in the flow control feedback information do not exceed the available buffer size, and/or, for each logical channel group (LCG) in the flow control feedback information, the second processing unit calculates the buffer size in the buffer status report for reporting based on a condition that the buffer size is not greater than the available buffer size of the logical channel group (LCG) in the flow control feedback information.

In a case where the flow control feedback information indicates an available data rate, the second processing unit 704 calculates an available buffer size according to the available data rate and a time interval between two times of transmitting adjacent buffer status reports (BSRs), calculates a buffer size of a BSR for reporting according to the available buffer size, and performs resource allocation.

In the case where the flow control feedback information indicates the available data rate at a granularity of a BH RLC channel, for the LCP process, the second processing unit 704 sets a prioritized bit rate of a logical channel corresponding to the BH RLC to be the smaller one in the original PBR and the available data rate.

In the case where the flow control feedback information indicates the available data rate at a granularity of a logical channel group (LCG), for the LCP process, the second processing unit 704 sets prioritized bit rates (PBRs) of logical channels in the logical channel group to be a smaller value in the original PBR of the logical channel and the available data rate/K; where, K is a natural number, denoting the number of logical channels in the LCG.

Furthermore, in a case where the integrated access and backhaul (IAB) node receives congestion clearance indication information from the parent node, the second processing unit 704 performs reporting of the buffer status report (BSR) and resource allocation of the logical channels according to the congestion clearance indication information.

In this disclosure, the apparatus 700 may include at least one of the first processing unit 703 and the second processing unit 704.

Reference may be made to the operations in the method of the embodiment of the second aspect for detailed explanations of the units in the apparatus 700.

According to the embodiment of the fourth aspect of this disclosure, the IAB-node receives the flow control feedback information used to indicate the load status of the uplink of the parent node. Hence, flow control may be controlled by the IAB-node, thereby improving precision of control and transmission efficiency of data while alleviating congestion of uplink transmission; and furthermore, the MT of the IAB-node may perform enhancement processing according to the flow control feedback information, thereby achieving uplink flow control.

Embodiment of a Fifth Aspect

The embodiment of this disclosure provides a communication system, and reference may be made to FIGS. 1 and 4, with contents identical to those in the embodiments of the first to the fourth aspects being not going to be described herein any further.

In some embodiments, the communication system may include:

an integrated access and backhaul node, including the signal transmission and reception apparatus 600 as described in the embodiment of the third aspect; and a child node of the integrated access and backhaul node, including the signal transmission and reception apparatus 700 as described in the embodiment of the fourth aspect.

The integrated access and backhaul (IAB) node may be, for example, the IAB-node 2 in FIG. 4, which may include an IAB-DU functional unit, and may further include an IAB-MT functional unit. The child node of the integrated access and backhaul (IAB) node may be, for example, the IAB-node 1 in FIG. 4, which may include an IAB-MT functional unit, and may further include an IAB-DU functional unit. The IAB-MT functional unit may have the same structure as a terminal equipment. And the IAB-DU functional unit may have the same structure as a network device.

Figure 8:
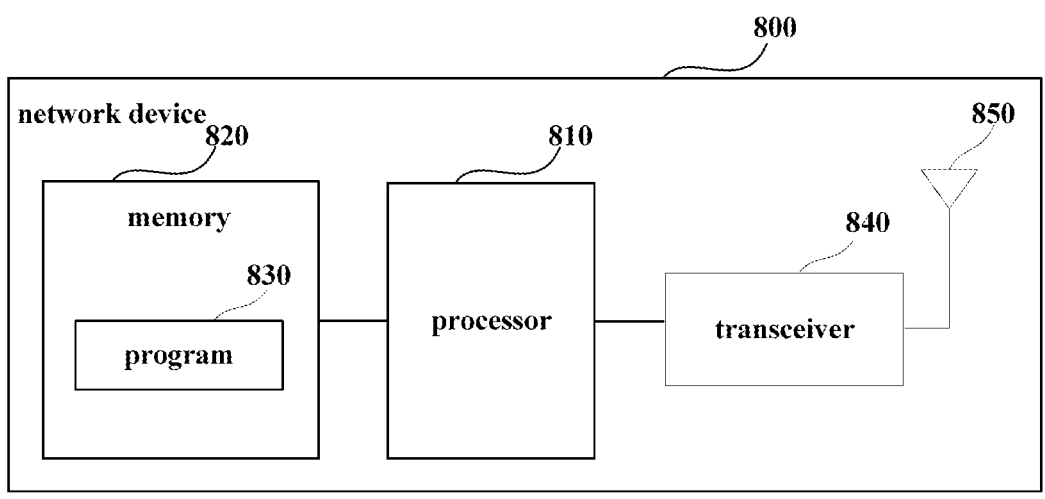
FIG. 8 is a schematic diagram of a structure of the network device in an embodiment of this disclosure.

FIG. 8 is a schematic diagram of a structure of a network device of the embodiment of this disclosure. As shown in FIG. 8, a network device 800 may include a processor 810 (such as a central processing unit (CPU)) and a memory 820, the memory 820 being coupled to the processor 810. The memory 820 may store various data, and furthermore, it may store a program 830 for data processing, and execute the program 830 under control of the processor 810.

For example, the processor 810 may be configured to execute a program to carry out the method executed by the IAB-node 2 in the embodiment of the first aspect.

Furthermore, as shown in FIG. 8, the network device 800 may include a transceiver 840, and an antenna 850, etc. Functions of the above components are similar to those in the related art, and shall not be described herein any further. It should be noted that the network device 800 does not necessarily include all the parts shown in FIG. 8, and furthermore, the network device 800 may include parts not shown in FIG. 8, and the related art may be referred to.

Figure 9:
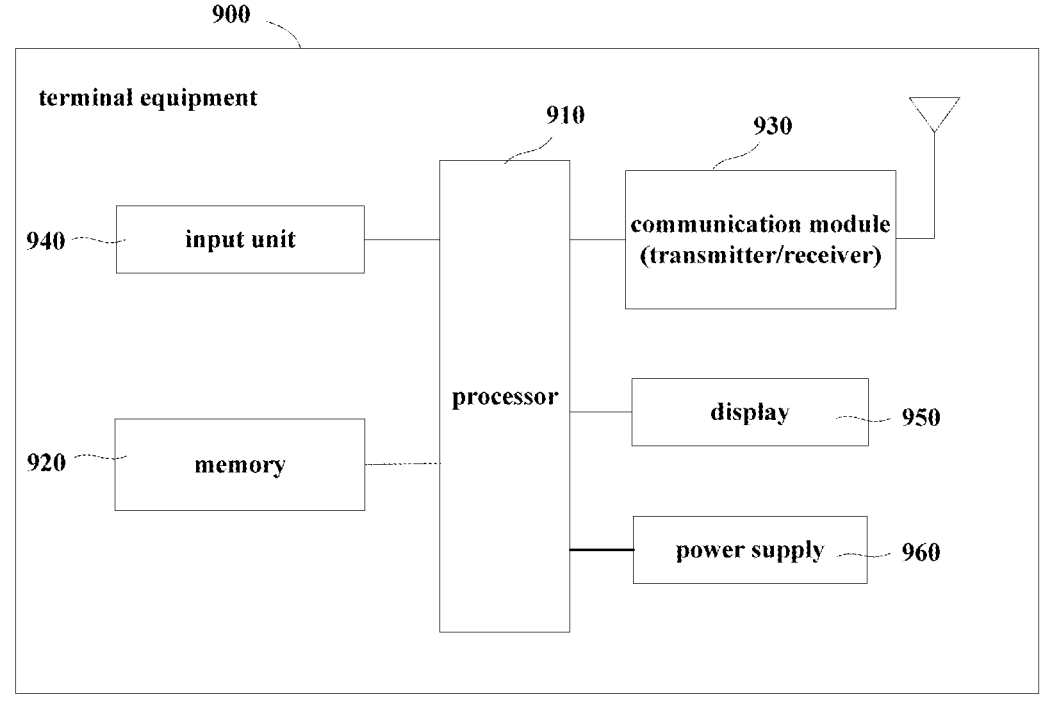
FIG. 9 is a schematic diagram of a terminal equipment in an embodiment of this disclosure.

FIG. 9 is a schematic diagram of a terminal equipment in the embodiment of this disclosure. As shown in FIG. 9, a terminal equipment 900 may include a processor 910 and a memory 920, the memory 920 storing data and a program and being coupled to the processor 910. It should be noted that this figure is illustrative only, and other types of structures may also be used, so as to supplement or replace this structure and achieve a telecommunications function or other functions. For example, the processor 910 may be configured to execute a program to carry out the method executed by the IAB-node 1 in the embodiment of the first aspect.

As shown in FIG. 9, the terminal equipment 900 may further include a communication module 930, an input unit 940, a display 950, and a power supply 960; wherein functions of the above components are similar to those in the related art, which shall not be described herein any further. It should be noted that the terminal equipment 900 does not necessarily include all the parts shown in FIG. 9, and the above components are not necessary. Furthermore, the terminal equipment 900 may include parts not shown in FIG. 9, and the related art may be referred to.

An embodiment of this disclosure provides a computer readable program, which, when executed in an IAB, causes the IAB to carry out the signal transmission and reception method as described in the embodiment of the first aspect.

An embodiment of this disclosure provides a computer storage medium, including a computer readable program, which causes an IAB to carry out the signal transmission and reception method as described in the embodiment of the first aspect.

An embodiment of this disclosure provides a computer readable program, which, when executed in an IAB child node, causes the IAB child node to carry out the signal transmission and reception method as described in the embodiment of the second aspect.

An embodiment of this disclosure provides a computer storage medium, including a computer readable program, which causes an IAB child node to carry out the signal transmission and reception method as described in the embodiment of the second aspect.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, an EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

As to implementations containing the above embodiments, following supplements are further disclosed.

A method at an IAB-DU side:

1. A signal transmission and reception method, including:
transmitting data by an integrated access and backhaul (IAB) node to a parent node via an uplink; and
transmitting flow control feedback information by the integrated access and backhaul node to a child node of the integrated access and backhaul node, the flow control feedback information being used to indicate a load status of uplink transmission of the integrated access and backhaul node.

2. The method according to supplement 1, wherein, when a buffer load of the integrated access and backhaul node exceeds a first threshold or a flow control request transmitted by the child node is received,
the integrated access and backhaul node transmits the flow control feedback information to the child node.

3. The method according to supplement 1, wherein the transmitting flow control feedback information includes:
generating a backhaul adaptation protocol control protocol data unit (BAP control PDU) used for transmitting the flow control feedback information by the integrated access and backhaul node according to a flow control type configured in an F1 application protocol (F1 AP), and transmitting the backhaul adaptation protocol control protocol data unit.

4. The method according to supplement 3, wherein, in a case where the F1 application protocol has configured an egress backhaul radio link control (BH RLC) channel for the backhaul adaptation protocol control protocol data unit (BAP control PDU), the backhaul adaptation protocol control protocol data unit (BAP control PDU) is submitted to the egress backhaul radio link control (BH RLC) channel.

5. The method according to supplement 4, wherein, a backhaul radio link control channel identification information element (BH RLC CH ID IE) of the egress backhaul radio link control (BH RLC) channel is associated with a backhaul adaptation protocol control protocol data unit (BAP control PDU) channel information element (IE) with a value being a first value.

6. The method according to supplement 3, wherein, in a case where the F1 application protocol has not configured an egress backhaul radio link control (BH RLC) channel for the backhaul adaptation protocol control protocol data unit (BAP control PDU), the backhaul adaptation protocol control protocol data unit (BAP control PDU) is submitted to any egress backhaul radio link control (BH RLC) channel of an egress link.

7. The method according to supplement 3, wherein, a backhaul adaptation protocol (BAP) sublayer of the integrated access and backhaul node includes a first protocol data unit (PDU) type, and when the configured flow control type is performing flow control by taking a logical channel group (LCG) as a granularity, the first protocol data unit (PDU) type used by the integrated access and backhaul node is flow control feedback taking a logical channel group (LCG) as a granularity.

8. The method according to supplement 1, wherein, contents of the flow control feedback information include:
an available buffer size; and/or
available data rate; and/or
indication information used for indicating congestion; and/or
congestion clearance indication information used for indicating that uplink of the integrated access and backhaul node is in a normal state.

9. The method according to supplement 1, wherein the method further includes:
receiving, by the integrated access and backhaul node, configuration information transmitted by a donor central unit of the integrated access and backhaul node (IAB-donor CU), the configuration information being used to configure a flow control type and/or the contents of the flow control feedback information.

A method at an IAB-MT side, receiving flow control feedback information:

1. A signal transmission and reception method, including:
transmitting data by an integrated access and backhaul (IAB) node to a parent node; and
receiving flow control feedback information transmitted by the parent node, the flow control feedback information being used to indicate a load status of uplink transmission of the parent node.

2. The method according to supplement 1, wherein, the method further includes:
transmitting a flow control request by the integrated access and backhaul (IAB) node to the parent node, wherein after transmitting the flow control request, the integrated access and backhaul (IAB) node receives the flow control feedback information.

3. The method according to supplement 2, wherein the transmitting the flow control request to the parent node includes:
generating a backhaul adaptation protocol control protocol data unit (BAP control PDU) used for transmitting the flow control request by the integrated access and backhaul node, and transmitting the backhaul adaptation protocol control protocol data unit.

4. The method according to supplement 3, wherein, in a case where an F1 application protocol is configured with an egress backhaul radio link control (BH RLC) channel of the backhaul adaptation protocol control protocol data unit (BAP control PDU), the backhaul adaptation protocol control protocol data unit (BAP control PDU) is submitted to the egress backhaul radio link control (BH RLC) channel.

5. The method according to supplement 4, wherein, a backhaul information information element (BH information IE) containing an egress backhaul radio link control channel identification information (egress BH RLC CH ID IE) to which the egress backhaul radio link control (BH RLC) channel corresponds is associated with a non-user plane flow type information element (non-UP flow type IE) with a value being a backhaul adaptation protocol control protocol data unit (BAP control PDU).

6. The method according to supplement 3, wherein, in a case where the F1 application protocol has not configured with the egress backhaul radio link control (BH RLC) channel for the backhaul adaptation protocol control protocol data unit (BAP control PDU), the backhaul adaptation protocol control protocol data unit (BAP control PDU) is submitted to any egress backhaul radio link control (BH RLC) channel of an egress link.

7. The method according to supplement 1, wherein, contents of the flow control feedback information include:

an available buffer size; and/or available data rate; and/or indication information used for indicating congestion; and/or congestion clearance indication information used for indicating that uplink of the parent node is in a normal state.

A method at an IAB-MT side, BAP entity enhancement:

1. A signal transmission and reception method, including:

receiving, by an integrated access and backhaul (IAB) node, flow control feedback information transmitted by a parent node, the flow control feedback information being used to indicate a load status of uplink transmission of the parent node; and passing down data by a backhaul adaption protocol (BAP) entity of the integrated access and backhaul (IAB) node to a lower layer according to the flow control feedback information.

2. The method according to supplement 1, wherein, in a case where the flow control feedback information indicates a congestion status by taking a backhaul radio link control (BH RLC) channel as a granularity, the backhaul adaption protocol (BAP) entity of the integrated access and backhaul (IAB) node passes down data mapped to an egress backhaul radio link control (BH RLC) channel indicated as being in a congestion status to the lower layer.

3. The method according to supplement 1, wherein, in a case where the flow control feedback information indicates a congestion status by taking a routing ID as a granularity, the backhaul adaption protocol (BAP) entity of the integrated access and backhaul (IAB) node does not pass down data with a backhaul adaption protocol (BAP) header containing a routing ID indicated as being in a congestion status to the lower layer.

4. The method according to supplement 1, wherein, in a case where the flow control feedback information indicates an available buffer size by taking a backhaul radio link control (BH RLC) channel as a granularity, the backhaul adaption protocol (BAP) entity of the integrated access and backhaul (IAB) node does not pass down data greater than the available buffer size corresponding to backhaul radio link control (BH RLC) channels in the data mapped to each backhaul radio link control (BH RLC) channel in the flow control feedback information to lower layer.

5. The method according to supplement 1, wherein, in a case where the flow control feedback information indicates an available buffer size by taking a routing ID as a granularity, for a routing ID in the flow control feedback information, the backhaul adaption protocol (BAP) entity of the integrated access and backhaul (IAB) node does not pass down data more than the available buffer size in data with a BAP header containing the routing ID to the lower layer.

6. The method according to supplement 1, wherein, in a case where the flow control feedback information indicates an available data rate by taking a backhaul radio link control (BH RLC) channel as a granularity, the backhaul adaption protocol (BAP) entity of the integrated access and backhaul (IAB) node passes data mapped to each backhaul radio link control (BH RLC) channel in the flow control feedback information to the lower layer at a rate not greater than the available data rate of the backhaul radio link control (BH RLC) channel indicated by the flow control feedback information.

7. The method according to supplement 1, wherein, in a case where the flow control feedback information indicates an available data rate by taking a routing ID as a granularity, for a routing ID in the flow control feedback information, the backhaul adaption protocol (BAP) entity of the integrated access and backhaul (IAB) node passes down data with a BAP header containing the routing ID at a rate not greater than the available data rate of the routing ID indicated by the flow control feedback information.

8. The method according to supplement 1, wherein, in a case where the integrated access and backhaul node receives congestion clearance indication information from the parent node, the backhaul adaption protocol (BAP) entity of the integrated access and backhaul (IAB) node passes down data to a lower layer according to the backhaul node receives congestion clearance indication information;

wherein the backhaul node receives congestion clearance indication information is used for indicating that uplink of the parent node is in a normal state.

A method at an IAB-MT side, MAC enhancement:

1. A signal transmission and reception method, including:

receiving, by an integrated access and backhaul (IAB) node, flow control feedback information transmitted by a parent node, the flow control feedback information being used to indicate a load status of uplink transmission of the parent node; and performing reporting of a buffer status report (BSR) and/or resource allocation of a logical channel by a medium access control (MAC) layer entity of the integrated access and backhaul (IAB) node.

2. The method according to supplement 1, wherein, in a case where the flow control feedback information indicates a congestion status by taking a backhaul radio link control (BH RLC) channel as a granularity, the medium access control (MAC) entity does not allocate a resource for a logical channel to which a backhaul radio link control (BH RLC) channel indicated as being in a congestion status corresponds.

3. The method according to supplement 1, wherein, in a case where the flow control feedback information indicates a congestion status by taking a backhaul radio link control (BH RLC) channel as a granularity, a buffer status report (BSR) reported by the medium access control (MAC) layer entity of the integrated access and backhaul (IAB) node does not include the logical channel to which a backhaul radio link control (BH RLC) channel indicated as being in a congestion status corresponds.

4. The method according to supplement 1, wherein, in a case where the flow control feedback information indicates a congestion status by taking a routing ID as a granularity, the medium access control (MAC) layer entity does not allocate a resource for data with a backhaul adaptation protocol (BAP) header containing a routing ID indicated as being in a congestion status.

5. The method according to supplement 1, wherein, in a case where the flow control feedback information indicates a congestion status by taking a routing ID as a granularity, a buffer status report (BSR) reported by the medium access control (MAC) layer entity of the integrated access and backhaul (IAB) node does not include a buffer size of data with a backhaul adaptation protocol (BAP) header containing a routing ID indicated as being in a congestion status.

6. The method according to supplement 1, wherein, in a case where the flow control feedback information indicates a congestion status by taking a logical channel group (LCG) as a granularity, the medium access control (MAC) layer entity does not allocate a resource for a logical channel group (LCG) indicated as being in a congestion status.

7. The method according to supplement 1, wherein, in a case where the flow control feedback information indicates a congestion status by taking a logical channel group (LCG) as a granularity, a buffer status report (BSR) reported by the medium access control (MAC) entity of the integrated access and backhaul (IAB) node does not include a logical channel group (LCG) indicated as being in a congestion status.

8. The method according to supplement 1, wherein, in a case where the flow control feedback information indicates an available buffer size by taking a backhaul radio link control (BH RLC) channel as a granularity, resources allocated by the medium access control (MAC) layer entity for a logical channel to which a backhaul radio link control (BH RLC) channel in the flow control feedback information corresponds do not exceed the available buffer size.

9. The method according to supplement 1, wherein, in a case where the flow control feedback information indicates an available buffer size by taking a backhaul radio link control (BH RLC) channel as a granularity, the medium access control (MAC) layer entity of the integrated access and backhaul (IAB) node calculates a buffer size of a logical channel to which the BH RLC channel in the buffer status report used for reporting corresponds according to a condition that the buffer size is not greater than the available buffer size of each backhaul radio link control (BH RLC) channel in the flow control feedback information.

10. The method according to supplement 1, wherein, in a case where the flow control feedback information indicates an available buffer size by taking a routing ID as a granularity, for each routing ID in the flow control feedback information, resources allocated by the medium access control (MAC) layer entity for data indicated as being the routing IDs do not exceed the available buffer size of the routing size indicated by the flow control feedback information.

11. The method according to supplement 1, wherein, in a case where the flow control feedback information indicates an available buffer size by taking a routing ID as a granularity, for each routing ID in the flow control feedback information, a buffer size in a buffer status report used for reporting calculated by the medium access control (MAC) layer entity does not exceed the available buffer size of the routing ID indicated by the flow control feedback information.

12. The method according to supplement 1, wherein, in a case where the flow control feedback information indicates an available buffer size by taking a logical channel group (LCG) as a granularity, resources allocated by the medium access control (MAC) layer entity for a logical channel group (LCG) in the flow control feedback information do not exceed the available buffer size.

13. The method according to supplement 1, wherein, in a case where the flow control feedback information indicates an available buffer size by taking a logical channel group (LCG) as a granularity, for each logical channel group (LCG) in the flow control feedback information, a buffer size of the LCG in the buffer status report reported by the medium access control (MAC) layer entity is not greater than a buffer size of the logical channel group (LCG) in the flow control feedback information.

14. The method according to supplement 1, wherein, in a case where the flow control feedback information indicates an available data rate, the medium access control (MAC) layer entity of the integrated access and backhaul (TAB) node calculates an available buffer size according to the available data rate and a time interval between two times of transmission of neighboring buffer status reports (BSR), and calculates a buffer size in the buffer status report used for reporting according to the available buffer size, and/or performs logical channel resource allocation.

15. The method according to supplement 1, wherein, in a case where the flow control feedback information indicates an available data rate by taking a backhaul radio link control (BH RLC) channel as a granularity, the medium access control (MAC) layer entity of the integrated access and backhaul (TAB) node sets a prioritized bit rate (PBR) of the logical channel to which the backhaul radio link control (BH RLC) channel corresponds to be the smaller one in an original PBR of the logical channel and the available data rate.

16. The method according to supplement 1, wherein, in a case where the flow control feedback information indicates an available data rate by taking a logical channel group (LCG) as a granularity, the medium access control (MAC) layer entity of the integrated access and backhaul (TAB) node sets a prioritized bit rates (PBR) of each logical channel in the logical channel group (LCG) to be to be smaller one in original PBRs of the logical channels and the available data rate/K; where, K is a natural number, indicating the number of logical channels in the logical channel group.

17. The method according to supplement 1, wherein, in a case where the medium access control (MAC) layer entity of the integrated access and backhaul (IAB) node receives congestion clearance indication information from the parent node, the medium access control (MAC) layer entity of the integrated access and backhaul (TAB) node performs reporting of the buffer status report (BSR) and resource allocation of the logical channels according to the congestion clearance indication information;

wherein the congestion clearance indication information is used to indicate that uplink of the parent node is already in a normal state.

What is claimed is:

1. A signal transmission and reception apparatus, applicable in an integrated access and backhaul node distributed unit (IAB-DU), comprising:

a first receiver configured to receive uplink data transmitted to a parent node of an integrated access and backhaul (IAB) node via an uplink; and a first transmitter configured to transmit flow control feedback information to a child node of the integrated access and backhaul node, the flow control feedback information being used to indicate a load status of uplink transmission of the integrated access and backhaul node, wherein the flow control feedback information includes the load status of the uplink transmission at a certain granularity.

2. The apparatus according to claim 1, wherein, when a buffer load of the integrated access and backhaul node exceeds a first threshold or the integrated access and backhaul node receives a flow control request of the child node, the first transmitter transmits the flow control feedback information to the child node.

3. The apparatus according to claim 1, wherein, the first transmitter generates a backhaul adaptation protocol control protocol data unit (BAP control PDU) used for transmitting the flow control feedback information according to a flow control type configured in an F1 application protocol (F1 AP), and transmits the backhaul adaptation protocol control protocol data unit.

4. The apparatus according to claim 3, wherein, in a case where the F1 application protocol has configured an egress backhaul radio link control (BH RLC) channel for the backhaul adaptation protocol control protocol data unit (BAP control PDU), the backhaul adaptation protocol control protocol data unit (BAP control PDU) is submitted to the egress backhaul radio link control (BH RLC) channel, a backhaul radio link control channel identification information element (BH RLC CH ID IE) of the egress backhaul radio link control (BH RLC) channel is associated with a backhaul adaptation protocol control protocol data unit channel (BAP control PDU channel) information element (IE) with a value being a first value.

5. The apparatus according to claim 3, wherein, a backhaul adaptation protocol (BAP) sublayer of the integrated access and backhaul node comprises a first protocol data unit type (PDU type), and when the configured flow control is flow control performed by taking a logical channel group (LCG) as a granularity, the first protocol data unit type (PDU type) used by the first transmitter is flow control feedback by taking a logical channel group (LCG) as a granularity.

6. The apparatus according to claim 1, wherein, contents of the flow control feedback information comprise:

an available buffer size; and/or an available data rate; and/or indication information used for indicating congestion; and/or congestion clearance indication information.

7. The apparatus according to claim 1, the apparatus further comprising:

a second receiver configured to receive configuration information transmitted by a central unit of the integrated access and backhaul node donor (IAB-donor CU), the configuration information being used to configure a flow control type and/or contents of the flow control feedback information.

8. The apparatus according to claim 7, wherein, the configuration information is transmitted via F1 AP.

9. A signal transmission and reception apparatus, applicable in an integrated access and backhaul node mobile termination (IAB-MT), comprising:

a third receiver configured to receive flow control feedback information transmitted by a parent node, the flow control feedback information being used to indicate a load status of uplink transmission of the parent node; and first processor circuitry, set in a backhaul adaption protocol (BAP) entity of the integrated access and backhaul (IAB) node, configured:

to pass down data to a lower layer according to the flow control feedback information, and not to allocate data contained in the flow control feedback information or corresponding to a congested routing ID to the lower layer.

10. The apparatus according to claim 9, wherein, in a case where the flow control feedback information indicates a congestion status by taking a backhaul radio link control (BH RLC) channel as a granularity, the first processor circuitry does not pass down data mapped to an egress backhaul radio link control (BH RLC) channel indicated as being in a congestion status to the lower layer.

11. The apparatus according to claim 9, wherein, in a case where the flow control feedback information indicates a congestion status by taking a routing ID as a granularity, the first processor circuitry does not pass down data with a backhaul adaption protocol (BAP) header containing a routing ID indicated as being in a congestion status to the lower layer.

12. The apparatus according to claim 9, wherein, in a case where the flow control feedback information indicates an available buffer size by taking a backhaul radio link control (BH RLC) channel as a granularity, the first processor circuitry does not pass down data more than the available buffer size in the data mapped to each backhaul radio link control (BH RLC) channel in the flow control feedback information to the lower layer.

13. The apparatus according to claim 9, wherein, in a case where the flow control feedback information indicates an available buffer size by taking a routing ID as a granularity, the first processor circuitry, for a routing ID in the flow control feedback information, does not pass down data more than the available buffer size in data with a BAP header containing the routing ID to the lower layer.

14. The apparatus according to claim 9, wherein, in a case where the integrated access and backhaul node receives congestion clearance indication information from the parent node, the first processor circuitry passes down data to the lower layer according to the congestion clearance indication information;

wherein the congestion clearance indication information is used for indicating that uplink of the parent node is in a normal state.

15. A signal transmission and reception apparatus, applicable in an integrated access and backhaul node mobile termination (IAB-MT), comprising:

a third receiver configured to receive flow control feedback information transmitted by a parent node, the flow control feedback information being used to indicate a load status of uplink transmission of the parent node; and second processor circuitry, set in a medium access control (MAC) layer entity of an integrated access and backhaul node, configured:

to perform reporting of a buffer status report (BSR) and/or resource allocation of a logical channel according to the flow control feedback information, not to calculate buffer information of data mapped to a congested routing ID or BH RLC channel or data corresponding to an LCG indicated as being congestion into the BSR, and/or not to perform resource allocation on data not included in the BSR, or for data mapped to a congested routing ID or BH RLC channel, or data corresponding to the LCG indicated as being congestion in the LCP process.

16. The apparatus according to claim 15, wherein, in a case where the flow control feedback information indicates a congestion status by taking a backhaul radio link control (BH RLC) channel as a granularity, the second processor circuitry does not allocate a resource for a logical channel to which a backhaul radio link control (BH RLC) channel indicated as being in a congestion status corresponds.

17. The apparatus according to claim 15, wherein, in a case where the flow control feedback information indicates a congestion status by taking a routing ID as a granularity, the second processor circuitry does not allocate a resource for data with a backhaul adaptation protocol (BAP) header containing a routing ID indicated as being in a congestion status.

18. The apparatus according to claim 15, wherein, in a case where the flow control feedback information indicates a congestion status by taking a logical channel group (LCG) as a granularity, the second processor circuitry does not allocate a resource for a logical channel group (LCG) indicated as being in a congestion status.

19. The apparatus according to claim 15, wherein, in a case where the flow control feedback information indicates an available data rate by taking a backhaul radio link control (BH RLC) channel as a granularity, the second processor circuitry sets a prioritized bit rate (PBR) of a logical channel to which the backhaul radio link control (BH RLC) channel corresponds to be the smaller one in an original PBR of the logical channel and the available data rate.

20. The apparatus according to claim 15, wherein, in a case where the integrated access and backhaul (IAB) node receives congestion clearance indication information from the parent node, the second processor circuitry performs reporting of the buffer status report (BSR) and resource allocation of the logical channel according to the congestion clearance indication information;

wherein the congestion clearance indication information is used to indicate that uplink of the parent node is in a normal state.

\*    \*    \*    \*    \*